(12) United States Patent
Terao

(10) Patent No.: US 6,389,121 B1
(45) Date of Patent: May 14, 2002

(54) METHOD AND APPARATUS OF PERFORMING A MEMORY SAVING OPERATION IN AN ELECTRONIC COMMUNICATIONS SYSTEM

(75) Inventor: Yuichi Terao, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/248,027

(22) Filed: Feb. 10, 1999

(30) Foreign Application Priority Data

Feb. 13, 1998 (JP) .......................................... 10-046327

(51) Int. Cl.[7] .......................... H04M 11/00; H04N 1/00; G06K 1/00
(52) U.S. Cl. ............................ 379/100.08; 379/100.09; 379/93.24; 358/404; 358/1.15
(58) Field of Search .............. 379/93.07, 93.233–93.24, 379/100.01, 100.05, 100.08, 100.09, 100.12, 100.14; 358/400, 402–403, 407, 442–444, 468, 1.13–1.15; 709/206–207, 246

(56) References Cited

U.S. PATENT DOCUMENTS

| 5,027,386 A | * | 6/1991 | Hisano | 379/100.05 |
| 5,537,218 A | * | 7/1996 | Negi | 358/444 |
| 5,577,108 A | * | 11/1996 | Mankovitz | 358/403 |
| 5,898,824 A | * | 4/1999 | Kato et al. | 358/444 |
| 6,046,824 A | * | 4/2000 | Barak | 379/100.09 |
| 6,137,597 A | * | 10/2000 | Kanaya | 358/402 |
| 6,141,695 A | * | 10/2000 | Sekiguchi et al. | 709/246 |
| 6,144,459 A | * | 11/2000 | Satou | 358/1.15 |

* cited by examiner

Primary Examiner—Curtis Kuntz
Assistant Examiner—George Eng
(74) Attorney, Agent, or Firm—Cooper & Dunham LLP

(57) ABSTRACT

A data terminal apparatus coupled to a local area network and a telephone line network includes a first and second communications mechanisms, a memory, a printer, and first and second controllers. The first communications mechanism exchanges electronic mail with other data terminals and a mail server. The second communications mechanism exchanges image information with facsimile terminals. The memory stores the image information which is received from one of the facsimile terminals. The printer reproduces the image information. The first controller generates electronic mail which includes the image information when the printer is in an inoperative condition, and sends the electronic mail to the mail server. Then, the first controller erases the image information from the memory. The second controller retrieves the electronic mail from the mail server when the printer recovers from the inoperative condition and instructs the printer to reproduce the image information included in the electronic mail.

28 Claims, 14 Drawing Sheets

Fig. 4

```
Data: 30 SEP 1997 14:07:50 +0900
X-Mailer: RICOH-Network-FAX Version 1.0
Mime-Version:1.0
Content-Type:multi-part/mixed
To:NFAX100/001@ricoh.co.jp
From: NFAX100/001@ricoh.co.jp
Subject: SUBSTITUTE RECEPTION
Message-ID:<XXXXXXXXXXXXXXX@***.co.jp>
boundary="......=_NextPart_000_01BB8B57.928620E0"
```
⎫ 31

```
TYPE:        Substitute Reception
File No:     1234
Time:        16:35
File Type:   MMR
Resolution:  Standard
Paper Wide:  A4
Total page:  3
```
⎫ 32

```
...RICOH_NETWORK_FAX_61FC571DAA...
Content-Type: image/tiff; name="FAX.TIFF"
Content-Transfer-Encoding:base64
Content-Description: "FAX.TIFF"

[Facsimile Image Information (MIME) ]

...RICOH_NETWORK_FAX_61FC571DAA...
```
⎫ 33

```
Data: 30 SEP 1997 14:07:50 +0900
X-Mailer: RICOH-Network-FAX Version 1.0
Mime-Version:1.0
Content-Type:multi-part/mixed
To:NFAX100/001@ricoh.co.jp
From: NFAX100/001@ricoh.co.jp
Subject: SEND LATER
Message-ID:<XXXXXXXXXXXXXX@***.co.jp>
boundary="......=_NextPart_000_01BB8B57.928620E0"
```
} 41

```
TYPE:         SEND LATER
File No:      1234
Time:         16:35
File Type:    MMR
Resolution:   Standard
Paper Wide:   A4
Total page:   3
Dial at:      02:15
Dial to:      0123-4567-8901
```
} 42

```
...RICOH_NETWORK_FAX_61FC571DAA...
Content-Type: image/tiff; name="FAX.TIFF"
Content-Transfer-Encoding:base64
Content-Description: "FAX.TIFF"

[Facsimile Image Information (MIME) ]

...RICOH_NETWORK_FAX_61FC571DAA...
```
} 43

```
Data: 30 SEP 1997 14:07:50 +0900
X-Mailer: RICOH-Network-FAX Version 1.0
Mime-Version:1.0
Content-Type:multi-part/mixed
To:NFAX100/002@ricoh.co.jp
From: NFAX100/002@ricoh.co.jp
Subject: QUICK DIAL
Message-ID:<XXXXXXXXXXXXXX@***.co.jp>
boundary="......=_NextPart_000_01BB8B57.928620E0"

TYPE:        QUICK DIAL
Dial No:     01
Line:        G3
Address:     03-456-1234
Name:        ABC Company
```

```
Data: 30 SEP 1997 14:07:50 +0900
X-Mailer: RICOH-Network-FAX Version 1.0
Mime-Version:1.0
Content-Type:multi-part/mixed
To:NFAX100/003@ricoh.co.jp
From: NFAX100/003@ricoh.co.jp
Subject: DOCUMENT BANK
Message-ID:<XXXXXXXXXXXXXX@***.co.jp>
boundary="......=_NextPart_000_01BB8B57.928620E0"
```
} 61

```
TYPE:      DOCUMENT BANK
Dial No:   01
Name:      Map Around ABC Company
```
} 62

```
...RICOH_NETWORK_FAX_61FC571DAA...
Content-Type: image/tiff; name="FAX.TIFF"
Content-Transfer-Encoding:base64
Content-Description: "FAX.TIFF"

[Facsimile Image Information (MIME) ]

...RICOH_NETWORK_FAX_61FC571DAA...
```
} 63

60

METHOD AND APPARATUS OF PERFORMING A MEMORY SAVING OPERATION IN AN ELECTRONIC COMMUNICATIONS SYSTEM

BACKGROUND

1. Field

The disclosed system and method relates to a network facsimile apparatus, and more particularly to a network facsimile apparatus which is capable of performing a memory saving operation.

2. Description of the Related Arts

There has been developed a network facsimile machine which is capable of communicating with both data terminals and facsimile machines. Such a network facsimile machine can exchange not only "computer information" such as E-mail (electronic mail) with data terminals on computer networks, including LANs (local area networks), WANs (wide area networks), the Internet, and so forth, but also "facsimile information" with ordinary facsimile machines using a standard facsimile communications procedure via a telephone line network such as a public switched telephone network (PSTN).

It would be useful to provide an effective and efficient system for relaying information and, more particularly, to provide an effective and efficient information relay service which allows users to send E-mail, for example, from a data terminal to a facsimile machine, and/or facsimile information from a facsimile machine to a data terminal, via the network facsimile machine.

It would be useful to provide an electronic communications system that can employ a plurality of the above-mentioned network facsimile apparatuses and provides a multi-step relay operation in which image information is relayed from a relay request station (a network facsimile apparatus) to a destination data terminal via one or more relay stations (network facsimile apparatuses). This would make communications largely flexible in the above-mentioned electronic communications system.

In such a network facsimile apparatus having various functions, a relatively large-sized memory capacity is required. However, a problem is that a magnetic disk drive unit which is generally used for the facsimile machines is relatively expensive in comparison with one for personal computers. Therefore, it would also be useful to provide a network facsimile apparatus with an appropriate method for conserving its memory capacity.

SUMMARY

The present application provides a data terminal apparatus that can be coupled to a local area network and a telephone network. In one embodiment, a data terminal apparatus includes a first communications mechanism, a second communications mechanism, a first controller, a memory, a printer and a second controller. The first communications mechanism exchanges electronic mail with other data terminals and a mail server on the local area network. The second communications mechanism exchanges image information with facsimile terminals on the telephone network. The memory stores the image information which is received from one of the facsimile terminals through the telephone network using the second communications mechanism. The printer reproduces the image information. The first controller generates electronic mail which includes the image information when the printer is in an inoperative condition, and sends the electronic mail to the mail server through the local area network using the first communications mechanism. Then, the first controller erases the image information from the memory. The second controller retrieves the electronic mail from the mail server when the printer recovers from the inoperative condition and instructs the printer to reproduce the image information included in the electronic mail.

The present application also provides another data terminal apparatus that is coupled to a local area network and to a telephone network. In one embodiment, another data terminal apparatus includes a first communications mechanism, a second communications mechanism, a memory, a first controller, and a second controller. The first communications mechanism exchanges electronic mail with other data terminals and a mail server on the local area network. The second communications mechanism exchanges image information with facsimile terminals on the telephone network. The memory stores arbitrary image information which is required to be sent at a designated time to at least one of the facsimile terminals through the telephone network using the second communications mechanism. The first controller generates electronic mail which includes the arbitrary image information stored in the memory, sends the electronic mail to the mail server through the local area network using the first communications mechanism, and erases the arbitrary image information from the memory. The second controller retrieves the electronic mail from the mail server when the designated time has passed, obtains the arbitrary image information included in the electronic mail, and sends the arbitrary image information to the at least one of the facsimile terminals.

The present application also provides another data terminal apparatus which is coupled to a local area network and to a telephone network. In one embodiment, another data terminal apparatus includes a first communications mechanism, a second communications mechanism, a memory, a first controller, and a second controller. The first communications mechanism exchanges electronic mail with other data terminals and a mail server on the local area network. The second communications mechanism exchanges image information with facsimile terminals on the telephone network. The memory stores arbitrary information. The first controller generates electronic mail which includes the arbitrary information stored in the memory, sends the electronic mail to the mail server through the local area network using the first communications mechanism, and erases the arbitrary information from the memory. The second controller retrieves the electronic mail from the mail server upon a request by an operator or by an operation being performed on the data terminal apparatus, obtains the arbitrary information included in the electronic mail, and provides the arbitrary information to the operator or the operation.

The arbitrary information may be a one-touch dial number, an abbreviated dial number, or image information.

The first controller may be capable of changing an electronic mail address when generating the electronic mail.

The present application also provides a memory saving method for a data terminal apparatus which is coupled to a local area network and to a telephone network. In one embodiment, a method includes the steps of receiving, storing, checking, generating, sending, erasing, checking, retrieving, and instructing. The receiving step receives image information from a facsimile terminal through the telephone network. The storing step stores the image infor-
} mation received from the facsimile terminal. The checking step checks whether a printer of the data terminal apparatus is in an operative condition. The generating step generates electronic mail which includes the image information when the printer is in an inoperative condition. The sending step sends the electronic mail to a mail server on the local area network. The erasing step erases the image information from the memory. The checking step checks whether the printer of the data terminal apparatus recovers from the inoperative condition. The retrieving step retrieves the electronic mail from the mail server when the printer recovers from the inoperative condition. The instructing step instructs the printer to reproduce the image information included in the electronic mail.

The present application also provides an electronic communications system. In one example, an electronic communications system includes a data terminal apparatus which is coupled to a local area network and to a telephone network. The data terminal apparatus includes a first communications mechanism, a second communications mechanism, a memory, a printer, a first controller, and a second controller. The first communications mechanism exchanges electronic mail with other data terminals and a mail server on the local area network. The second communications mechanism exchanges image information with facsimile terminals on the telephone network. The memory stores the image information which is received from one of the facsimile terminals through the telephone network using the second communications mechanism. The printer reproduces the image information. The first controller generates electronic mail which includes the image information when the printer is in an inoperative condition, sends the electronic mail to the mail server through the local area network using the first communications mechanism, and erases the image information from the memory. The second controller retrieves the electronic mail from the mail server when the printer recovers from the inoperative condition and instructs the printer to reproduce the image information included in the electronic mail.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is an illustration of an exemplary print queue electronic mail generated by the network facsimile apparatus of FIG. 3;

FIG. 7 is an illustration of an exemplary designated-time transmission electronic mail generated by the network facsimile apparatus of FIG. 3;

FIG. 10 is an illustration of an exemplary virtual memory electronic mail generated by the network facsimile apparatus of FIG. 3;

FIG. 11 is an illustration of another exemplary virtual memory electronic mail generated by the network facsimile apparatus of FIG. 3.

DETAILED DESCRIPTION

Figure 1:
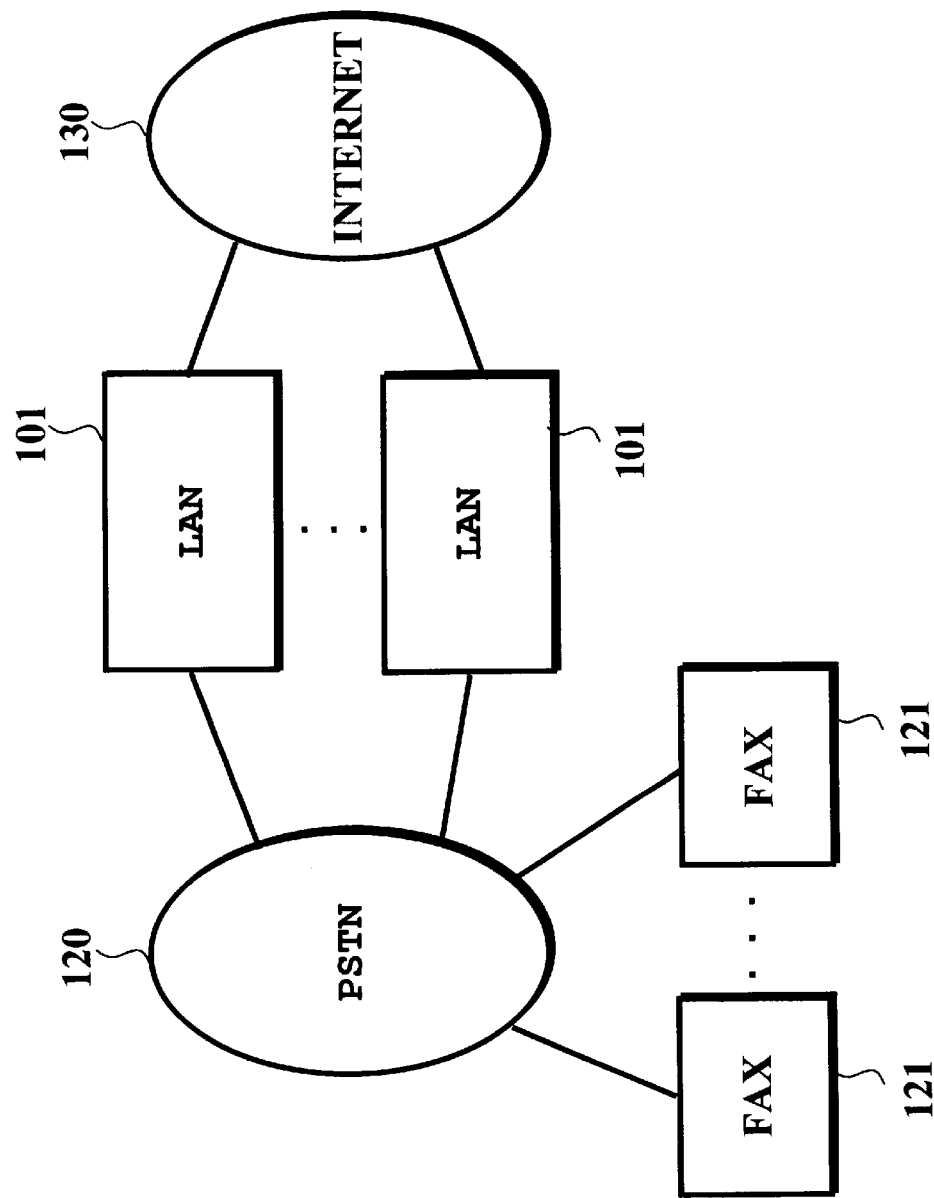
FIG. 1 is a block diagram of an electronic communications system including local area networks with a network facsimile apparatus according to an embodiment of the present invention.

In describing preferred embodiments of the present invention illustrated in the drawings, specific terminology is employed. However, the application is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system. The electronic communications system of FIG. 1 includes various types of electronic communications networks including a plurality of local area networks (LANs) 101, a public switched telephone network (PSTN) 120, the Internet 130, and possibly other networks which are not specifically illustrated. In the electronic communications system of FIG. 1, the LANs 101 are connected to both the PSTN 120 and the Internet 130. The PSTN 120 which includes a wide-area telephone network, has connections also to a plurality of ordinary facsimile terminals including a plurality of facsimile machines (FAXs) 121, and provides various telephone-based communications services to all the machines connected thereto. The Internet 130 which includes worldwide computer connections provides various computer-based communications services to all the computer terminals connected thereto. Preferably, each of FAXs 121 transmits and receives image information through a Group 3 facsimile communications procedure.

Figure 2:
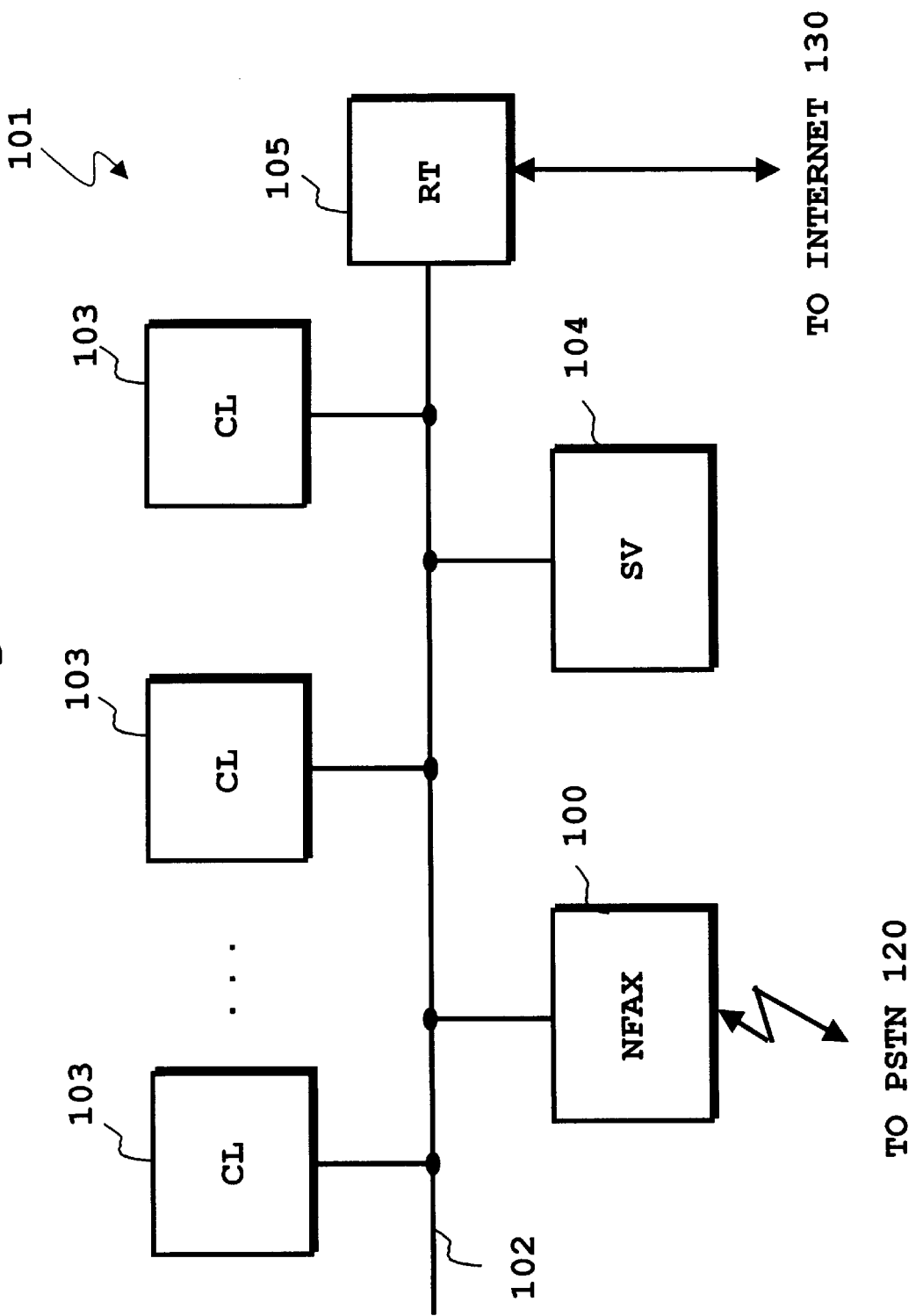
FIG. 2 is a block diagram of one of the local area networks with the network facsimile apparatus included in the electronic communications system of FIG. 1.

As shown in FIG. 2, each LAN 101 includes a network facsimile apparatus (NFAX) 100, a network line (NL) 102, a plurality of client terminals (CLs) 103, a mail server (SV) 104, and a router (RT) 105. In the LAN 101 of FIG. 2, the NFAX 100 has connections to the NL 102 and the PSTN 120 to function as a bidirectional gateway between these two different networks. Similarly, the RT 105 is connected to the NL 102 and the Internet 130 to function as a gateway between the LAN 101 and the Internet 130. With these connections, each of the LANs 101 has connections to the plurality of ordinary facsimile terminals including the FAXs 121 through the PSTN 120 and to the plurality of communications networks including other LANs 101 through the Internet 130.

The NFAX 100 has various functions which include, for example, an E-mail (electronic mail) function, general facsimile functions, information relay functions, and so forth. The E-mail function sends and receives E-mail to and from data terminals through the NL 102. The general facsimile functions include, for example, Group 3 facsimile communications capabilities for receiving facsimile image information from a facsimile machine, and transmitting facsimile image information made by reading a document to a facsimile machine, through the PSTN 120. The information relay functions include an "ordinary relay function" for relaying information from a facsimile machine (e.g. FAX 121) to another facsimile machine, or from a data terminal (e.g. CL 103) to another data terminal. The information relay functions also include a "gateway relay function" for relaying image information from a data terminal (e.g. CL 103) to a facsimile machine (e.g. FAX 121), or from a facsimile machine (e.g. FAX 121) to a data terminal (e.g. CL 103). More specifically to the gateway relay function, a gateway relay request from a facsimile machine (e.g., the FAX 121), or from a data terminal (e.g., the CL 103), normally includes image information to be relayed and a destination address such as a sub-address for a data terminal, or a facsimile number for a facsimile machine. At a gateway relay request, the NFAX 100 relays image information using the E-mail function and a designated sub-address which corresponds to one of E-mail addresses of the data terminals (e.g., the CLs 103), or using the Group 3 facsimile communications procedure and a designated facsimile number which corresponds to one of the facsimile machines (e.g. FAX 121). Preferably, the facsimile numbers used in the above-mentioned gateway relay operation are short-cut numbers which are previously registered.

In addition, when the NFAX 100 receives E-mail which is addressed to itself, the NFAX 100 extracts image information from the contents of the E-mail and reproduces it on a recording sheet, so that the user can see the information. Further, in the E-mail operation, E-mail contains image information which is converted from binary image information into man-readable information using a certain conversion method such as a "BASE 64," for example, since E-mail cannot contain binary data. Such a format of the contents of E-mail is referred to as a MIME (Multi-purpose Internet Mail Extensions).

Each of the CLs 103 has various application software programs including programs that are usually used by one or more individual users on an exclusive basis. Preferably, one of the programs performs an E-mail function for exchanging data with other terminals through the NL 102. Also, one of the programs preferably processes facsimile image information included in E-mail sent from the NFAX 100.

Each of LANs 101 employs a mail server system in which incoming E-mail is first stored in the SV 104 and then sent to a destination client terminal which is one of the CLs 103. More specifically, when the LAN 101, for example, receives E-mail, the mail server system of the LAN 101 checks a destination mail address which is attached to the E-mail. If the destination mail address is for one of CLs 103 of the LAN 101, the mail server system of the LAN 101 stores the E-mail into the SV 104. When the E-mail has a destination mail address which does not correspond to one of the CLs 103 of the LAN 101, the mail server system of the LAN 101 transfers the E-mail to the Internet 130 via the RT 105. Then, the E-mail is sent to another communications network in turn to seek the destination terminal machine, or to a host machine that has an address corresponding to the destination mail address attached to the E-mail, through a data transmission function of the Internet 130.

In the above-described mail server system, the NFAX 100 and the CLs 103 send a request to the SV 104 at a certain interval to check if it stores incoming E-mail addressed to a user of the machine that sends the request. Upon receiving a response indicating that the SV 104 stores E-mail which is addressed to the user of the requesting machine, the requesting machine sends a request to the SV 104 for sending that E-mail to the requesting machine. After receiving the E-mail, the requesting machine informs the user of the incoming E-mail. For the above-described communications, the requesting machine and the SV 104 preferably use a POP (Post Office Protocol) protocol.

Generally, communication between machines of a local area network requires the machines to use a so-called protocol-suite. The protocol-suite defines a combination of two different communications protocols. One protocol, preferably, a TCP/IP (Transmission Control Protocol/Internet Protocol), is set for up to a transport layer of an OSI (Open Systems Interconnection). Another protocol is set for the layers higher than the transport layer. For example, an SMTP (Simple Mail Transfer Protocol) which is used for communication of E-mail is used for the layers higher than the transport layer.

The above-mentioned communication protocols, such as the TCP/IP, SMTP, and POP, as well as the data format and structure of the E-mail, including the MIME, are defined in an RFC (Request For Comments) published by an IETF (Internet Engineering Task Force). For example, the TCP and IP are defined in an RFC793, the SMTP in an RFC821, and the data format and structure of the E-mail in an RFC822, RFC1521, RFC1522, and RFC1468.

Next, an exemplary structure of the NFAX 100 will be explained with reference to FIG. 3. The NFAX 100 of FIG. 3 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operations of the network facsimile apparatus 100, including facsimile data transmission controls for transmitting and receiving image information. The system memory 2 stores control (or application) programs to be executed by the system controller 1 and corresponding data used when the control programs are executed by the system controller 1. In addition, the system memory 2 includes a working memory area reserved for use by the system controller 1. The parameter memory 3 stores various kinds of parameters and information specific to the network facsimile apparatus 100. The clock circuit 4 generates information of the present time.

The scanner 5 reads an image of a document at one of several predetermined image reading resolutions. The printer 6 produces an image output at one of several predetermined print resolutions. The display panel unit 7 includes various kinds of operational keys and indicators interfacing between an operator and the NFAX 100.

The encoding/decoding unit 8 encodes image information to be transmitted to other facsimile terminals so that the information is compressed. The encoding/decoding unit 8 also decodes the compressed image information, which are transmitted from other facsimile terminals, back into original image information. The image memory 9 stores a plurality of files of data including image data that are compressed.

The Group 3 facsimile modem 10 is preferably a Group 3 facsimile modem that performs the functions of a modem for the Group 3 facsimile machine. The Group 3 facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The network controller 11 has direct connections to the Group 3 facsimile modem 10. The network controller 11 includes an automatic transmitting and receiving function and controls the connection of the NFAX 100 to the PSTN 120.

The LAN interface 12 is a communication interface between the LAN data transmission controller 13 and the NL 102 of the LAN 101. The LAN data transmission controller 13 controls the communications for exchanging information with other data terminals (e.g. CLs 103) of the LAN 101 through the NL 102, using various protocol-suites. The controller 13 can also control communications for exchanging information with data terminals which are connected to a local area network other than the same LAN 101, via the Internet 130.

Figure 3:
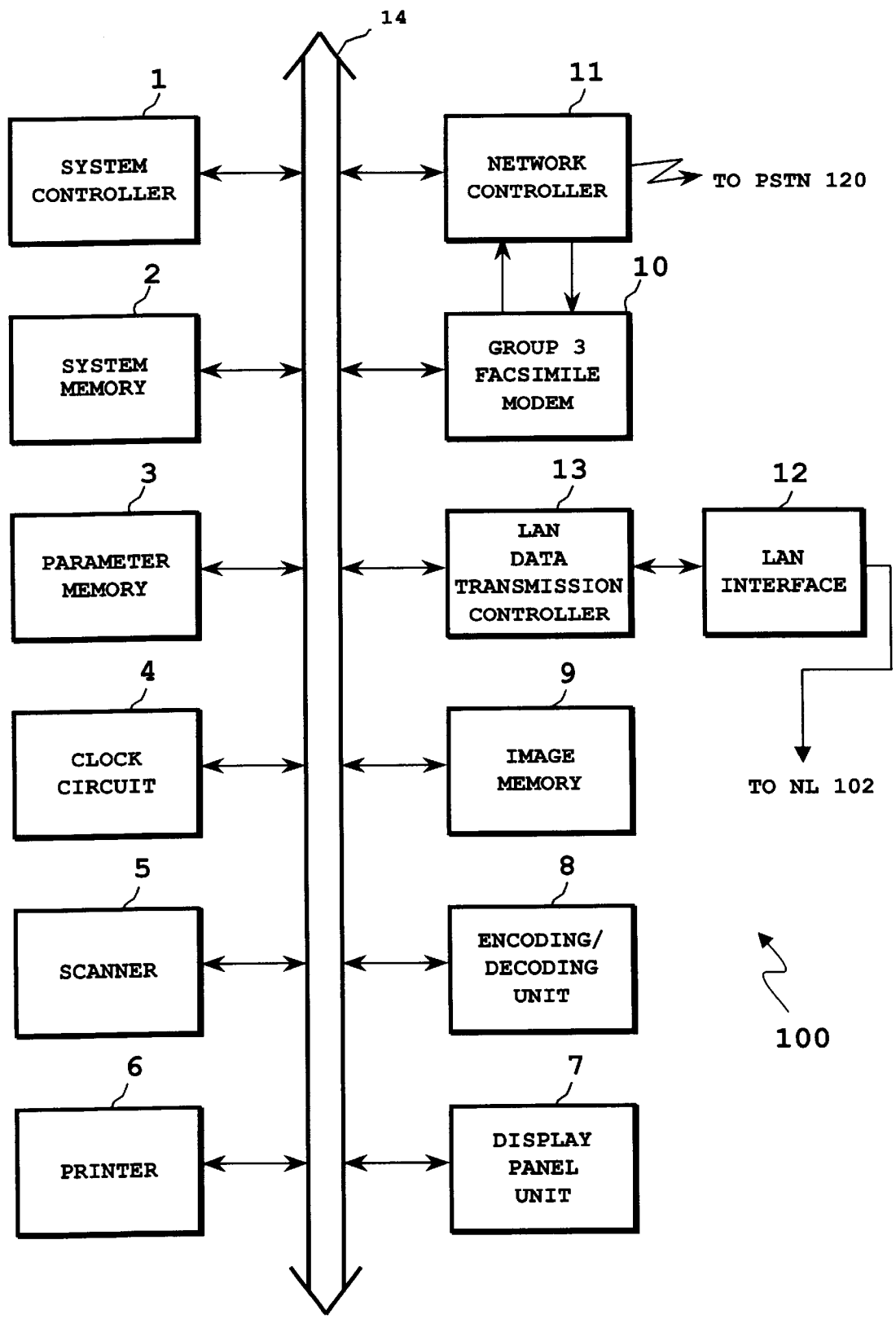
FIG. 3 is a block diagram of the network facsimile apparatus included in the local area networks of FIG. 2.

The above-described units of the NFAX 100 are connected commonly to the internal bus 14, directly or indirectly, as shown in FIG. 3, so as to communicate with each other.

In addition, the NFAX 100 includes a sub-address conversion table (not shown) for converting a sub-address received from a facsimile terminal (e.g., the FAX 121) to a corresponding E-mail address of a data terminal (e.g., the CL 103). Upon receiving facsimile image information with information designating a sub-address from a facsimile terminal (e.g., the FAX 121), the NFAX 100 converts the sub-address into an E-mail address and relays the facsimile image information to a data terminal (e.g., the CL 103) using the E-mail address.

At each receipt of facsimile image information from a facsimile terminal (e.g., the FAX 121) through the PSTN 120, the above-described NFAX 100 checks a destination address, such as a facsimile number or a sub-address, which is attached to the facsimile image information. If no destination address is found, the NFAX 100 determines that the received facsimile image information is addressed to itself. Accordingly, upon completing the receiving operation in which the received facsimile image information is temporarily stored in the image memory 9, the NFAX 100 converts the received facsimile image information into ordinary image data using the encoding/decoding unit 8. The NFAX 100 subsequently reproduces an image on a recording sheet in accordance with the ordinary image data using the printer 6.

Next, a first exemplary memory saving operation of the NFAX 100 is explained with reference to FIGS. 4, 5A, 5B, 6A, and 6B. As described above, the NFAX 100 uses the printer 6 to reproduce an image on a recording sheet in accordance with the ordinary image data which is decoded from the received facsimile image information. At this time of printing, the printer 6 may be in an inoperative condition due to a print suspending event such as a "paper-out," a "paper-jam," or the like. If this occurs on a communications terminal (e.g., the FAX 121) having a built-in printer and an image memory, the terminal instructs the printer to execute the printing of the image data after the causes of the print suspending event is removed. In this case, if the cause of the print suspending event is not removed after a relatively long period of time, a number of image data files may form a print queue in the image memory, waiting to be printed. Accordingly, the image memory, which has a limited memory capacity, may fill with the image data files and, as a result, the communications terminal may have a problem of insufficient memory capacity. However, according to an embodiment of the present application, an action taken by the NFAX 100 at such an event is different from that taken by a typical communications terminal.

Unlike the above-mentioned typical communications terminal, the NFAX 100 is configured to check if the printer 6 is in an operative condition, when receiving facsimile image information from a communications terminal (e.g., the FAX 121). Also, the NFAX 100 is configured to transfer the received facsimile image information to the SV 104 by E-mail when determining that the printer 6 is in an inoperative condition, and to erase the received facsimile image information from the image memory 9 upon completing the transmission to the SV 104. Thereby, the memory in the image memory 9 is saved and the received facsimile image information will be stored in the SV 104. The E-mail for this transmission is referred to as a print queue E-mail, and an operation for transmitting a print queue E-mail to the SV 104 is referred to as a print queue E-mail operation. The NFAX 100 is configured to retrieve thus-saved facsimile image information from the SV 104 after the printer 6 is recovered from the inoperable condition.

FIG. 4 illustrates an example of print queue E-mail 30 arranged in a MIME format. The print queue E-mail 30 of FIG. 4 includes a header 31, a first part 32, and a second part 33. The header 31 identifies the nature of the E-mail, with various kinds of information such as "Date: 30 Sep 1997 14:07:50 +0900," "To: NFAX100/001@ricoh.co.jp," "From: NFAX100/001@ricoh.co.jp," "Subject: SUBSTITUTE RECEPTION," and so forth. The indication "Date: 30 Sep 1997 14:07:50 +0900" of the header 31 identifies the date of transmission of this print queue E-mail. The indication "To: NFAX100/001@ricoh.co.jp" identifies an E-mail address of a destination communications terminal, which is identical to a first E-mail address of the NFAX 100. The indication "From: NFAX100/001@ricoh.co.jp" identifies an E-mail address of a source communications terminal, which is also identical to the first E-mail address of the NFAX 100. With these indications, the print queue E-mail can be returned to the NFAX 100 when so requested. The indication "Subject: SUBSTITUTE RECEPTION" indicates that the subject contents of the print queue E-mail is the substitute reception.

The first part 32 identifies the nature of the document contained in the E-mail, with various kinds of information such as "Type: Substitute Reception," "File No: 1234," "Time: 16:35," "File type: MMR," "Resolution: Standard," "Paper wide: A4," "Total page: 3," and so forth. The indication "Substitute Reception" of the first part 32 indicates that this E-mail is a print queue E-mail containing image information needed to be substitutionally received by the terminal indicated in the "To" field. The indication "File No: 1234" identifies the file number of the facsimile image information. The indication "Time: 16:35" identifies the reception time of the facsimile image information. The indication "File type: MMR" identifies the type (e.g., a encoding method) of file of the facsimile image information. The indication "Resolution: Standard" indicates that the facsimile image information requires the standard resolution. The indication "Paper wide: A4" indicates that the facsimile image information requires the paper DIN A4. The indication "Total page: 3" indicates that the facsimile image information has a total number of 3 pages. The second part 33 contains the MIME-formatted document representing all the pages of the image information.

Figure 5A:
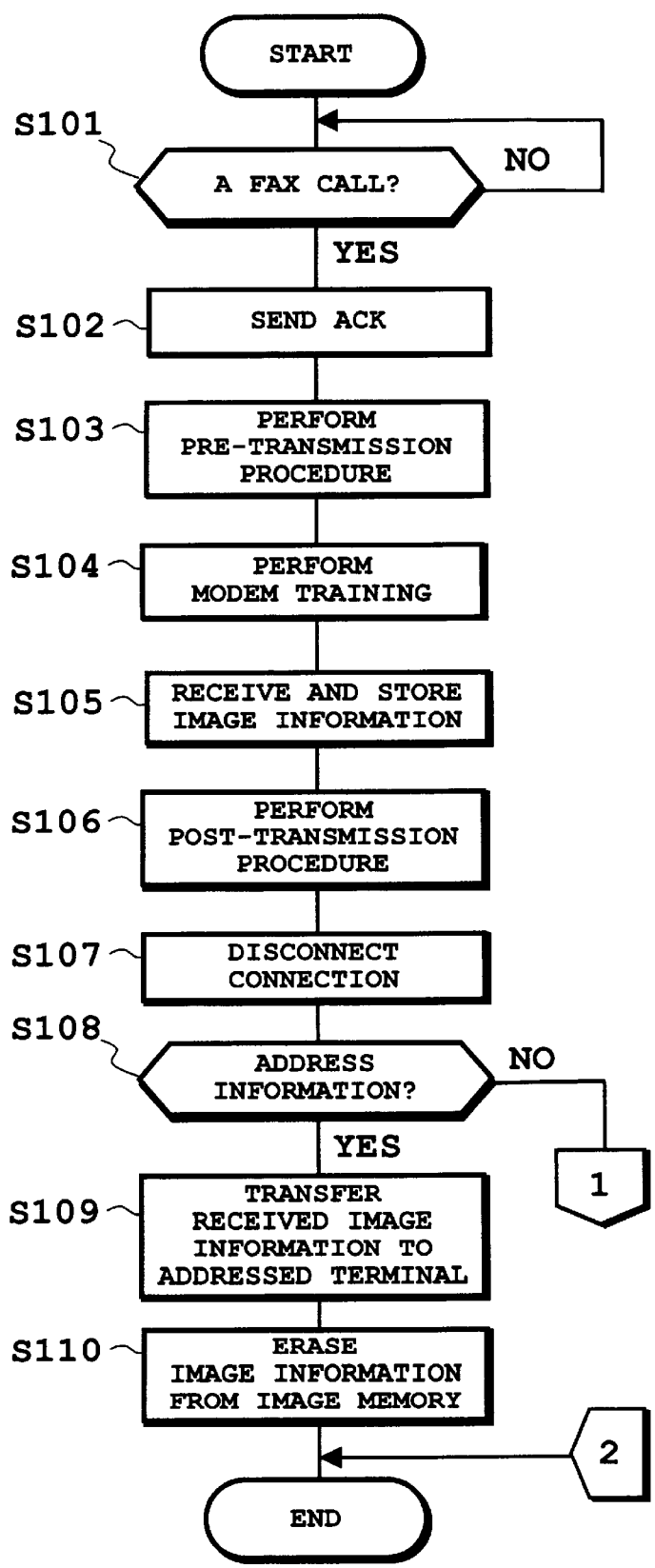
FIGS. 5A–5B are flowcharts for explaining an exemplary image information receiving operation including a memory saving operation of the network facsimile apparatus of FIG. 3.
Figure 5B:
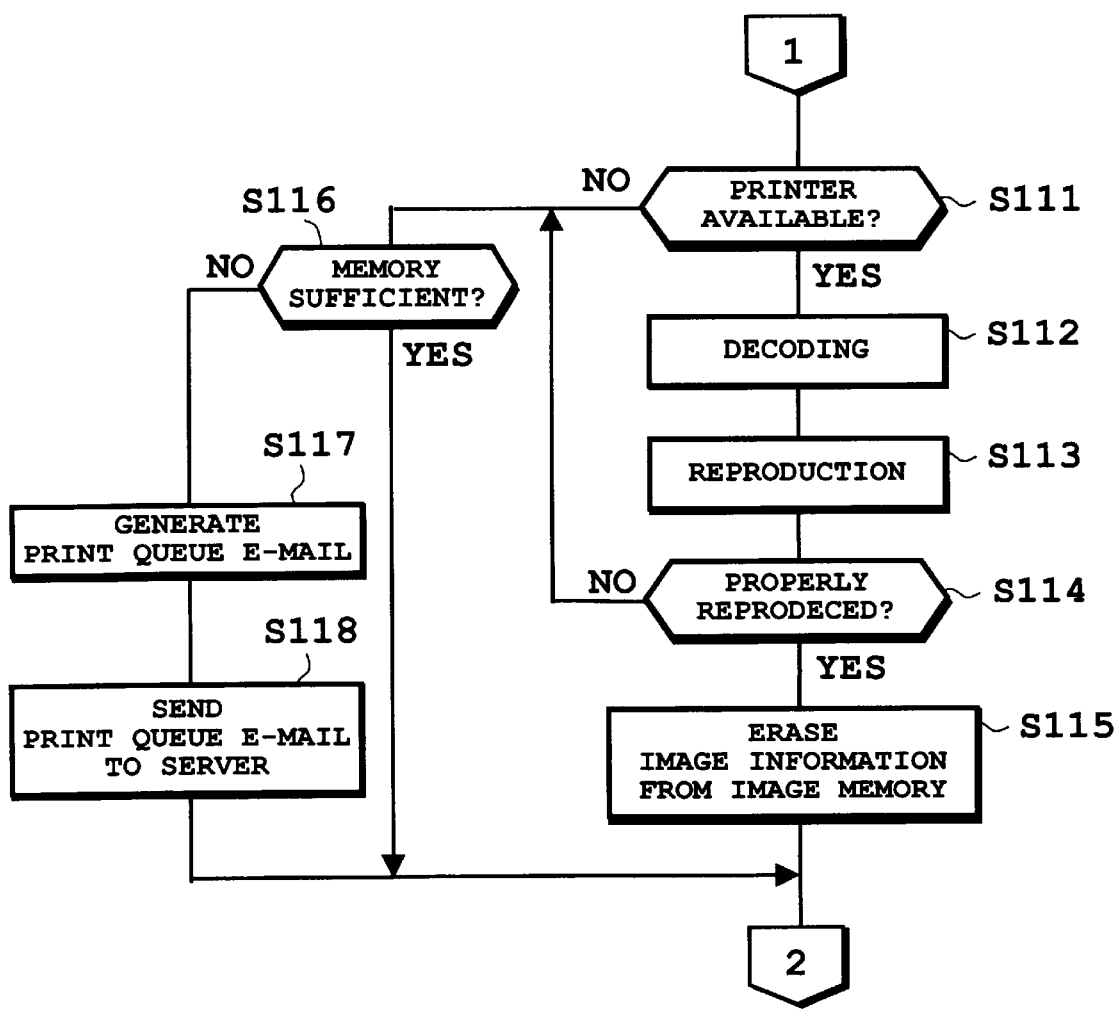

FIGS. 5A and 5B explain an example of an image information receiving operation of the NFAX 100 for receiving a call for image information from the FAX 121 through the PSTN 120. In Step S101 of FIG. 5A, the Group 3 facsimile modem 10 of the NFAX 100 checks an incoming call from the FAX 121, for example, through the PSTN 120.

Since Step S101 forms a NO loop, the Group 3 facsimile modem 10 continues the check until it receives a call. Upon receipt of a call, the Group 3 facsimile modem 10 returns an acknowledgment to the FAX 121 in Step S102. Subsequently, in Step S103, the Group 3 facsimile modem 10 performs a pre-transmission procedure for negotiating and determining transmission features with the FAX 121. Then, in Step S104, the Group 3 facsimile modem 10 performs a modem training procedure for determining a data rate for use in the transmission. Upon completing the modem training procedure, the Group 3 facsimile modem 10 performs an image information receiving operation in Step S105. During the image information receiving operation by the Group 3 facsimile modem 10 in Step S105, the system controller 1 instructs the Group 3 facsimile modem 10 to transfer the received image information to the image memory 9. Thereby, the received image information is stored in the image memory 9, in Step S105. Upon completing the image information receiving operation, the Group 3 facsimile modem 10 performs a post-transmission procedure in Step S106, and then disconnects the connection to the FAX 121 in Step S107.

Then, the system controller 1 checks, in Step S108, if the Group 3 facsimile modem 10 receives address information designated as a destination address for the received image information from the FAX 121. If the Group 3 facsimile modem 10 receives the designated destination address and the check result of Step S108 is YES, the process proceeds to Step S109. In Step S109, the system controller 1 performs a relay operation, using the Group 3 facsimile modem 10 and the network controller 11, for relaying the received image information to a destination machine in accordance with the designated destination address. Upon completing the relaying operation, the system controller 1 erases the received image information from the image memory 9 in Step S110. Then, the operation ends.

If the Group 3 facsimile modem 10 receives no designated destination address and the check result of Step S108 is NO, the process proceeds to Step S111 of FIG. 5B. In Step S111, the system controller 1 checks whether the printer 6 is in an operative condition. When the printer 6 is in an operative condition and the check result of Step S111 is YES, the process proceeds to Step S112 in which the system controller 1 decodes the received image information using the encoding/decoding unit 8. Thereby, the received image information is converted into image data. Then, in Step S113, the system controller 1 instructs the printer 6 to reproduce an image in accordance with the image data onto a recording sheet. In Step S114, the system controller 1 checks if the printer 6 has properly completed the printing operation without an error. If the printer 6 has properly completed the printing operation without an error and the check result of Step S114 is YES, the system controller 1 erases the corresponding received image information from the image memory 9 in Step S115. Then, the operation ends.

The process proceeds to Step S116, when the printer 6 is not in an operative condition and the check result of Step S111 is NO, or if the printer 6 has not properly completed the printing operation and the check result of Step S114 is NO. In Step S116, the system controller 1 checks if the image memory 9 has a sufficient amount of available memory to keep the received image information therein. For example, it can be determined that a sufficient amount of available memory exists if image memory 9 has space for storing a predetermined number of pages, such as at least ten pages of image information, for example. If the image memory 9 has a sufficient amount of available memory and the check result of Step S116 is YES, no additional action is required except to keep the received image information in the image memory 9. Then, the operation ends.

If the image memory 9 does not have a sufficient amount of available memory and the check result of Step S116 is NO, the process proceeds to Step S117. In Step S117, the system controller 1 generates print queue E-mail containing the received image information. Subsequently, in Step S118, the system controller 1 sends the print queue E-mail to the SV 104. Then, the operation ends.

In this way, the NFAX 100 executes the image information receiving operation.

Figure 6A:
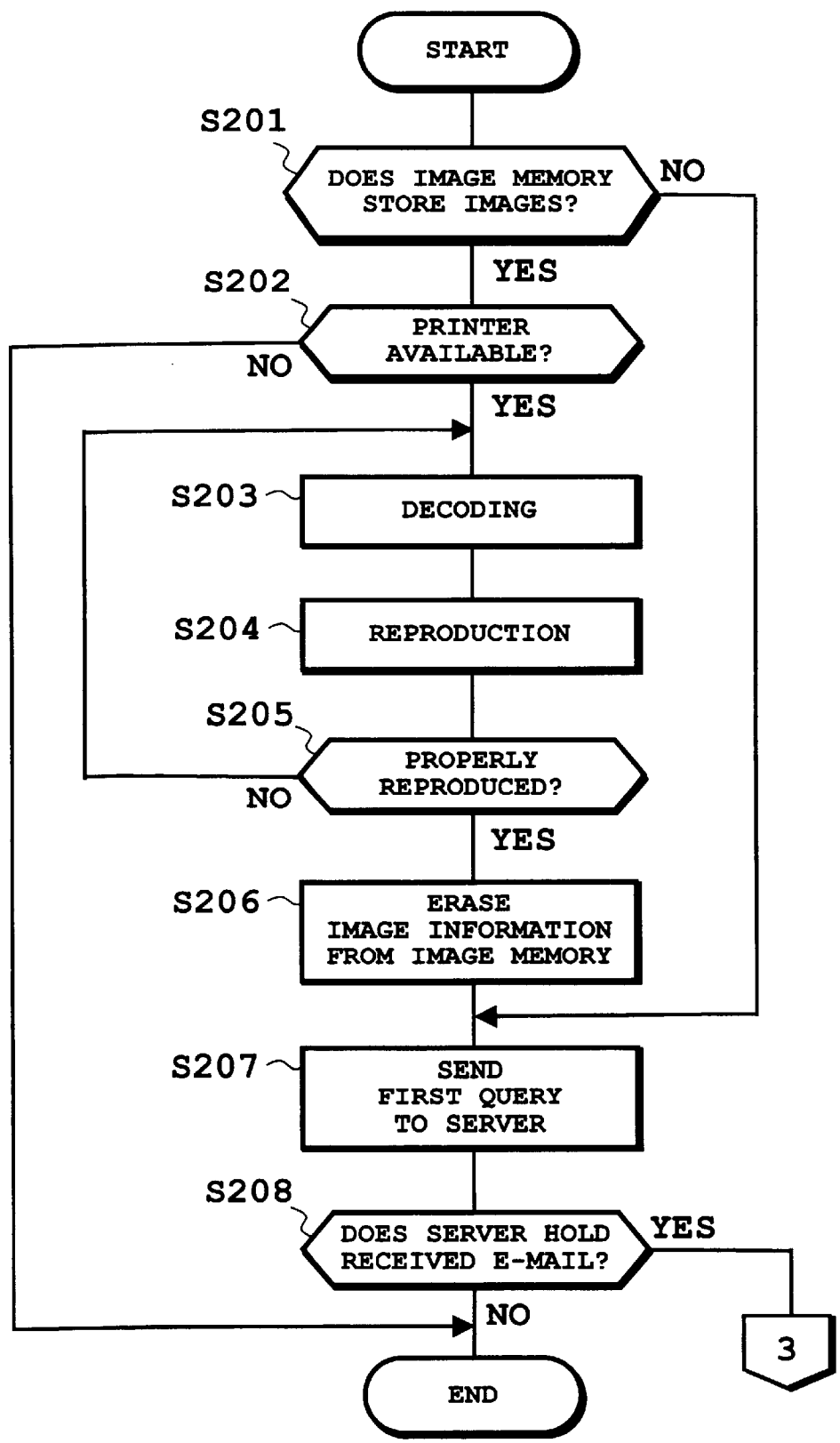
FIGS. 6A–6B are flowcharts for explaining an exemplary print operation including the memory saving operation of the network facsimile apparatus of FIG. 3.
Figure 6B:
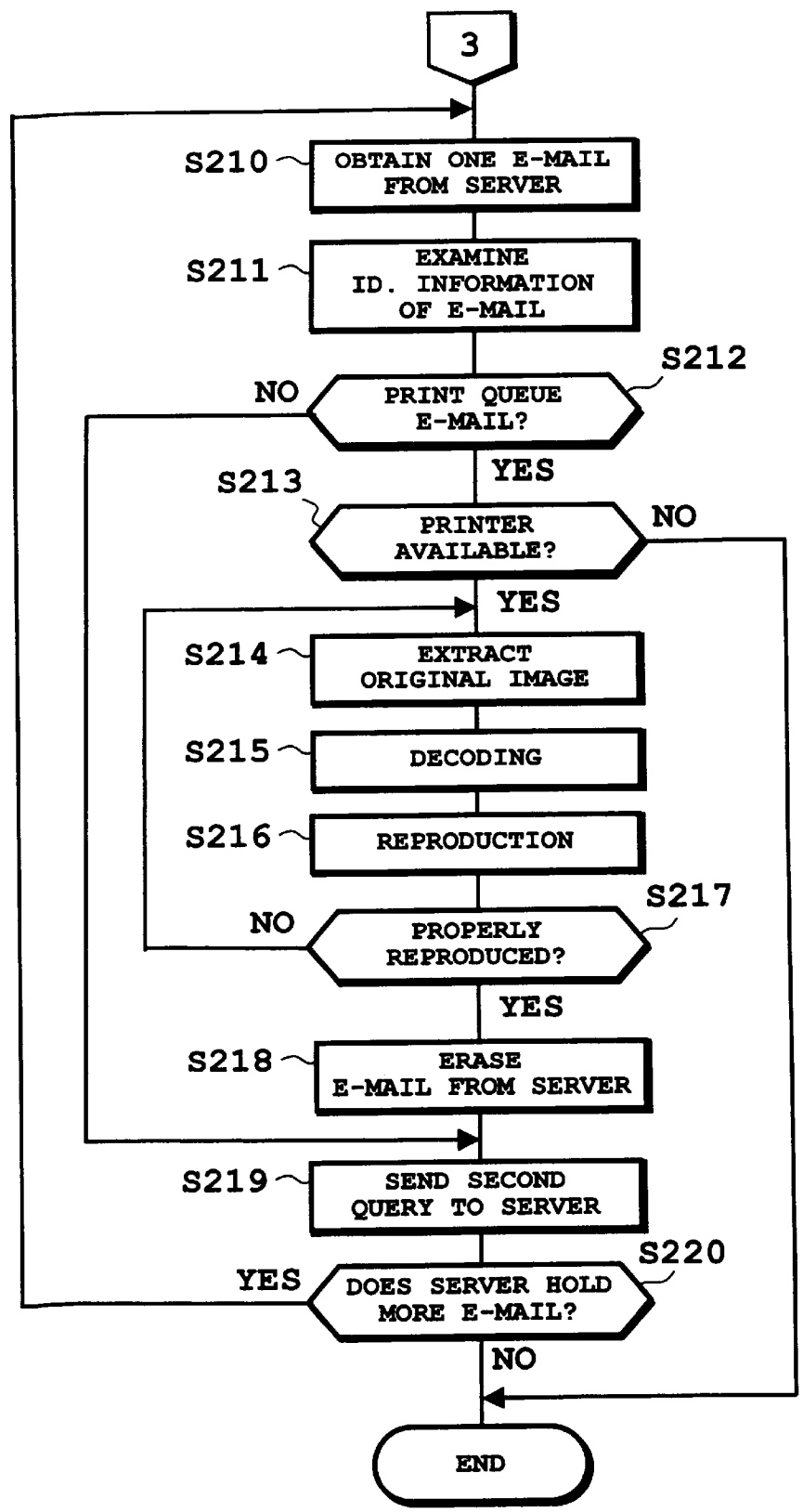

FIGS. 6A and 6B explain an exemplary print operation with respect to image information which is stored in the image memory 9 or in the SV 104. Preferably, the print operation of FIGS. 6A and 6B is initiated at predetermined intervals as timed by a timer (not shown) which is included in the clock circuit 4 or at an arbitrary time by the operator.

In Step S201 of FIG. 6A, the system controller 1 checks if the image memory 9 holds any file of the received image information which is temporarily stored in the image memory 9 after being sent from a communications terminal (e.g., the FAX 121). If the image memory 9 holds no file of the received image information and the check result of Step S201 is NO, the process proceeds to Step S207 (explained later). If the image memory 9 holds at least a file of the received image information and the check result of Step S201 is YES, the process proceeds to Step S202 in which the system controller 1 checks whether or not the printer 6 is in an operative condition. When the printer 6 is not in an operative condition and the check result of Step S202 is NO, the operation ends.

When the printer 6 is in an operative condition and the check result of Step S202 is YES, the process proceeds to Step S203 in which the system controller 1 decodes the received image information using the encoding/decoding unit 8. Thereby, the received image information is converted into image data. Then, in Step S204, the system controller 1 instructs the printer 6 to reproduce an image in accordance with the image data onto a recording sheet. In Step S205, the system controller 1 checks if the printer 6 has properly completed the printing operation without an error. If the printer 6 has not properly completed the printing operation and the check result of Step S205 is NO, the process returns to Step S203 to retry the information decoding and printing operations.

If the printer 6 has properly completed the printing operation without an error and the check result of Step S205 is YES, the system controller 1 erases the corresponding received image information from the image information 9 in Step S206. Then, in Step S207, the system controller 1 instructs the LAN data transmission controller 13 to send a first query to the SV 104 asking for a storage of at least a file of E-mail addressed to the NFAX 100. Upon receiving the first query, the SV 104 returns an answer to the first query to the NFAX 100. In Step S208, the system controller 1 determines, with the answer from the SV 104, whether the SV 104 stores at least a file of E-mail which has been addressed to the NFAX 100. When the SV 104 stores no file of E-mail which has been addressed to the NFAX 100 and the check result of Step S208 is NO, the operation ends.

When the SV 104 stores at least a file of E-mail which has been addressed to the NFAX 100 and the check result of Step S208 is YES, the operation proceeds to Step S210 of FIG. 6B. In Step S210, the system controller 1 instructs the LAN data transmission controller 13 to obtain a file of E-mail addressed to the NFAX 100. Upon obtaining a file of E-mail using the LAN data transmission controller 13, the system controller 1 examines the document identification information contained in the E-mail, in Step S211.

In accordance with the examination result of Step S211, the system controller 1 determines, in Step S212, whether the obtained E-mail is the print queue E-mail. When the obtained E-mail is not the print queue E-mail and the determination result of Step S212 is NO, the process proceeds to Step S219 (explained later). When the obtained E-mail is the print queue E-mail and the determination result of Step S212 is YES, the process proceeds to Step S213 in which the system controller 1 checks whether the printer 6 is in an operative condition. When the printer 6 is not in an operative condition and the check result of Step S213 is NO, the operation ends.

When the printer 6 is in an operative condition and the check result of Step S213 is YES, the process proceeds to Step S214 in which the system controller 1 extracts the MIME formatted document from the print queue E-mail and returns the MIME formatted document to its original state as the received facsimile image information. Then, in Step S215, the system controller 1 decodes the received image information using the encoding/decoding unit 8. Thereby, the received image information is converted into image data. Then, in Step S216, the system controller 1 instructs the printer 6 to reproduce an image in accordance with the image data onto a recording sheet. In Step S217, the system controller 1 checks if the printer 6 has properly completed the printing operation without an error. If the printer 6 has not properly completed the printing operation and the check result of Step S217 is NO, the process returns to Step S214 to retry the information restoring and printing operations.

If the printer 6 has properly completed the printing operation without an error and the check result of Step S217 is YES, the process proceeds to Step S218 in which the system controller 1 instructs the LAN data transmission controller 13 to send to the SV 104 a request for erasing the corresponding stored E-mail. Then, in Step S219, the system controller 1 instructs the LAN data transmission controller 13 to send a second query to the SV 104 asking if the SV 104 still holds a file of E-mail which is addressed to the NFAX 100. Upon receiving the second query, the SV 104 returns an answer to the second query to the NFAX 100. In Step S220, the system controller 1 determines, with the answer from the SV 104, whether the SV 104 still holds a file of E-mail which has been addressed to the NFAX 100. When the SV 104 still holds a file of E-mail which has been addressed to the NFAX 100 and the check result of Step S220 is YES, the operation returns to Step S210 to repeat the operation. When the SV 104 holds no file of E-mail which has been addressed to the NFAX 100 and the check result of Step S220 is NO, the operation ends.

In this way, the NFAX 100 arranges a temporary storage of the received facsimile image information at the SV 104 by way of sending the print queue E-mail to the SV 104 when the printer 6 is in an inoperative condition. The NFAX 100 also arranges a retrieval of the print queue E-mail so as to reproduce the received facsimile image information when the printer 6 recovers from the inoperative condition. Thereby, the NFAX 100 can conserve the image memory 9 and avoid a problem of insufficient memory capacity which may be caused when the printer 6 is in an inoperative condition.

Next, a second exemplary memory saving operation of the NFAX 100 is explained with reference to FIGS. 7–9. The second exemplary memory saving operation relates to a designated-time transmission mode. On a sending facsimile terminal (e.g., the FAX 121) which has an image memory, when an operator sends facsimile image information to a destination facsimile terminal using the designated-time transmission mode, the facsimile image information will be held in the image memory to wait for an execution of transmission at a designated time. In this case, if a number of facsimile image information are to be sent using the designated-time transmission mode, the image memory may have a problem in that its memory capacity may be insufficient. However, an action taken by the NFAX 100 at such an event is different from that of the above-mentioned typical sending facsimile terminal.

Unlike the above-mentioned typical sending facsimile terminal, the NFAX 100 is configured to send E-mail for transferring facsimile image information to the SV 104 for temporary storage when the operator instructs the NFAX 100 to send the facsimile image information with the designated-time transmission mode, and to erase the facsimile image information from the image memory 9 upon completing the transmission to the SV 104. Thereby, the memory capacity of the image memory 9 is conserved and the facsimile image information will be stored in the SV 104. The E-mail for this transmission is referred to as a designated-time transmission E-mail, and an operation for transmitting a designated-time transmission E-mail to the SV 104 is referred to as a designated-time transmission E-mail operation. The NFAX 100 is configured to retrieve the facsimile image information from the SV 104 and to send it to a destination terminal at the designated-time.

FIG. 7 illustrates an example of designated-time transmission E-mail 40 arranged in a MIME format. The designated-time transmission E-mail 40 of FIG. 7 includes a header 41, a first part 42, and a second part 43. The header 41 identifies the nature of the E-mail, with various kinds of information such as "Date: 30 Sep. 1997 14:07:50 +0900," "To: NFAX100/001@ricoh.co.jp", "From: NFAX100/001@ricoh.co.jp", "Subject: SEND LATER," and so forth. These pieces of information in the header 41 are similar to those in the header 31 of FIG. 4, except for the "Subject" field. The indication "Subject: SEND LATER" of the header 41 indicates that this E-mail is the designated-time transmission E-mail.

The first part 42 identifies the nature of the document contained in the E-mail, with various kinds of information such as "Type: Send Later," "File No: 1234," "Time: 16:35," "File type: MMR," "Resolution: Standard," "Paper wide: A4," "Total page: 3," "Dial at: 02:15," "Dial to: 0123-4567-8901," and so forth. These pieces of information of the first part 42 are similar to those in the first part 32 of FIG. 4, except for "Type:," "Dial at:," and "Dial to:" fields. The indication "Type: Send Later" of the first part 42 indicates that this E-mail is designated-time transmission E-mail containing image information needed to be transmitted to a destination terminal indicated in the "Dial at:" field at a designated time indicated in the "Dial to:" field. The second part 43 contains the MIME-formatted document representing all the pages of the image information.

Figure 8:
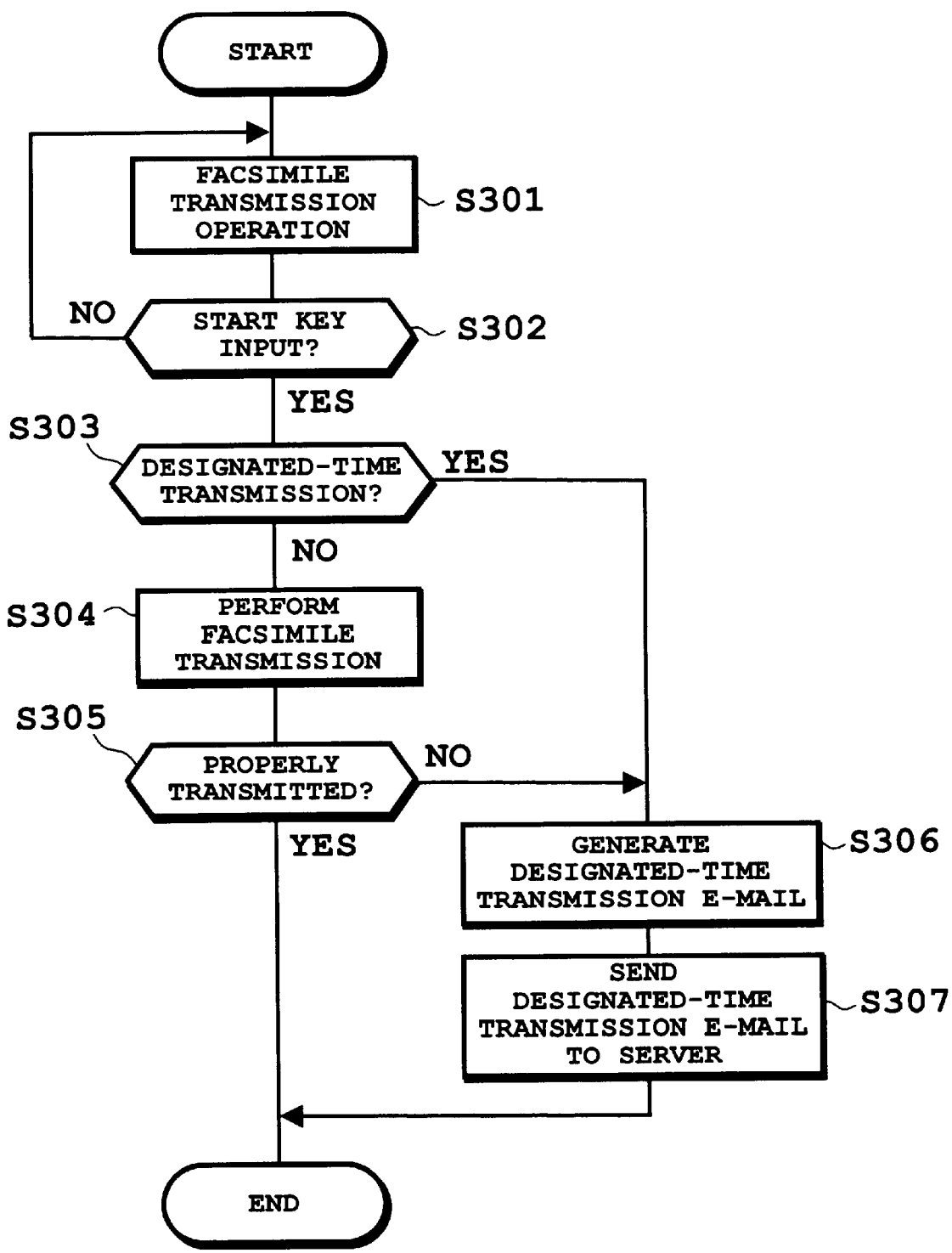
FIGS. 8 and 9 are flowcharts for explaining an exemplary designated-time transmission operation including the memory saving operation of the network facsimile apparatus of FIG. 3.
Figure 9:
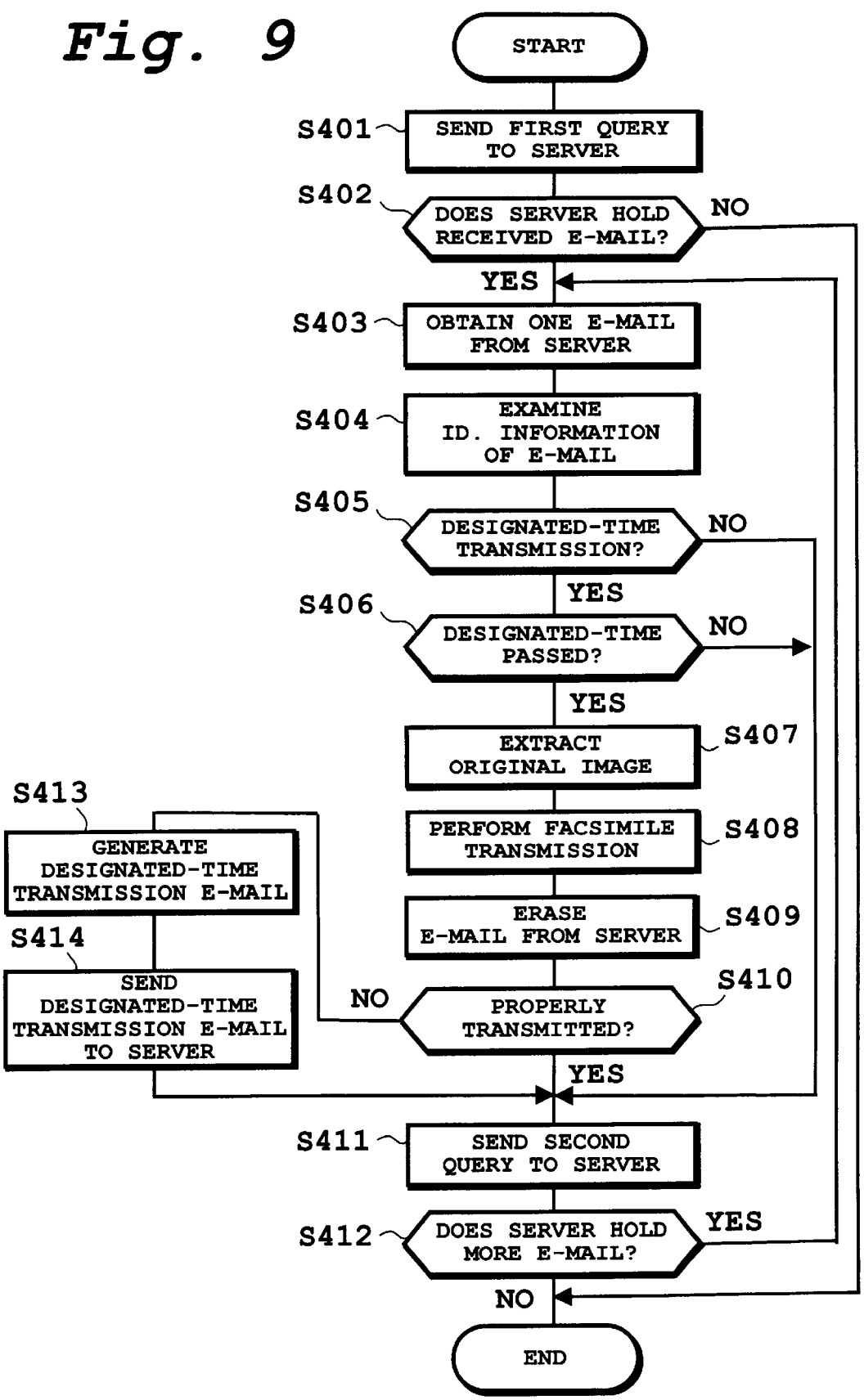

FIGS. 8 and 9 explain an example of an image information transmission operation of the NFAX 100. In Step S301 of FIG. 8, the operator performs an image information transmission operation, and the system controller 1 of the NFAX 100 checks, in Step S302, if the operator inputs a start command. Since Step S302 forms a NO loop with Step S301, the process proceeds to Step S303 only once the operator inputs a start command and the check result of Step S302 is YES. In Step S303, the system controller 1 checks whether the image information transmission operation is entered with the designated-time transmission mode. When the image information transmission operation is entered without the designated-time transmission mode and the check result of Step S303 is NO, the system controller 1 performs the image information transmission operation in Step S304. Then, in Step S305, the system controller 1 checks if the Group 3 facsimile modem 10 has properly completed the image information transmission operation. If the Group 3 facsimile modem 10 has properly completed the image information transmission operation and the check result of Step S305 is YES, the operation ends.

The process proceeds to Step S306, when the image information transmission operation is entered with the designated-time transmission mode and the check result of Step S303 is YES, or if the Group 3 facsimile modem 10 has not properly completed the image information transmission operation and the check result of Step S305 is NO. In Step S306, the system controller 1 newly generates designated-time transmission E-mail so as to try to perform the image information transmission operation with respect to the failed facsimile image information, using the designated time transmission mode. Accordingly, the new designated-time transmission E-mail contains the same designated destination address, a new designated-time which is set to a next retry time, and the same facsimile image information. Then, in Step S307, the system controller 1 sends the newly-generated designated-time transmission E-mail to the SV 104. Then, the operation ends.

When the designated-time transmission E-mail is generated in Step S306 in the above-described case when the check result of Step S305 is NO, the system controller 1 sets a next retry time to the designated transmission time and a telephone number, which has been used in the image information transmission operation in Step S304, to a destination address.

In this way, the NFAX 100 executes the designated time transmission E-mail operation so as to temporarily store the facsimile image information with the designated-time transmission mode, at the SV 104.

FIG. 9 explains an exemplary transmission operation with respect to facsimile image information with the designated-time transmission mode, which is stored in the SV 104. Preferably, the transmission operation of FIG. 9 is initiated at predetermined intervals with a timer (not shown) which is included in the clock circuit 4 or at an arbitrary time by the operator.

In Step S401 of FIG. 9, the system controller 1 instructs the LAN data transmission controller 13 to send a first query to the SV 104 asking for a storage of at least a file of E-mail addressed to the NFAX 100. Upon receiving the first query, the SV 104 returns an answer to the first query to the NFAX 100. In Step S402, the system controller 1 determines, with the answer from the SV 104, whether the SV 104 stores at least a file of E-mail which has been addressed to the NFAX 100. When the SV 104 stores no file of E-mail which has been addressed to the NFAX 100 and the check result of Step S402 is NO, the operation ends.

When the SV 104 stores at least a file of E-mail which has been addressed to the NFAX 100 and the check result of Step S402 is YES, the operation proceeds to Step S403. In Step S403, the system controller 1 instructs the LAN data transmission controller 13 to obtain a file of E-mail addressed to the NFAX 100. Upon obtaining a file of E-mail using the LAN data transmission controller 13, the system controller 1 examines the document identification information contained in the E-mail, in Step S404.

In accordance with the examination result of Step S404, the system controller 1 determines, in Step S405, whether the obtained E-mail is the designated-time transmission E-mail. When the obtained E-mail is not the designated-time transmission E-mail and the determination result of Step S405 is NO, the process proceeds to Step S411 (explained later). When the obtained E-mail is the designated-time transmission E-mail and the determination result of Step S405 is YES, the process proceeds to Step S406 in which the system controller 1 checks whether or not the designated time has passed. When the designated time has not passed and the check result of Step S406 is NO, the process proceeds to Step S411 (explained later).

When the designated time has passed and the check result of Step S406 is YES, the process proceeds to Step S407 in which the system controller 1 extracts the MIME formatted document from the designated-time transmission E-mail and returns the MIME formatted document to its original state as the facsimile image information. Then, in Step S408, the system controller 1 performs the image information transmission operation in accordance with the document identification information examined in Step S404, using the Group 3 facsimile modem 10. Thereby, the NFAX 100 sends the facsimile image information to the designated destination terminal at the designated time. Then, in Step S409, the system controller 1 instructs the LAN data transmission controller 13 to send to the SV 104 a request for erasing the corresponding stored E-mail.

In Step S410, the system controller 1 checks if the image information transmission operation has properly been completed without an error. If the image information transmission operation has properly been completed without an error and the check result of Step S410 is YES, the process proceeds to Step S411. In Step S411, the system controller 1 instructs the LAN data transmission controller 13 to send a second query to the SV 104 asking if the SV 104 still holds a file of E-mail which is addressed to the NFAX 100. Upon receiving the second query, the SV 104 returns an answer to the second query to the NFAX 100. In Step S412, the system controller 1 determines, with the answer from the SV 104, whether the SV 104 still holds a file of E-mail which has been addressed to the NFAX 100. When the SV 104 still holds a file of E-mail which has been addressed to the NFAX 100 and the check result of Step S412 is YES, the operation returns to Step S403 to repeat the operation. When the SV 104 holds no file of E-mail which has been addressed to the NFAX 100 and the check result of Step S412 is NO, the operation ends.

If the image information transmission operation has not properly been completed and the check result of Step S410 is NO, the process proceeds to Step S413. In Step S413, the system controller 1 newly generates designated-time transmission E-mail so as to try to perform the image information transmission operation with respect to the failed facsimile image information, using the designated time transmission mode. Accordingly, the new designated-time transmission E-mail contains the same designated destination address, a new designated-time which is set to a next retry time, and the same facsimile image information. Then, in Step S414, the system controller 1 sends the new designated-time transmission E-mail to the SV 104. Then, the process proceeds to Step S411 in which the system controller 1 arranges to send a second query to the SV 104, as described above.

In this way, the NFAX 100 arranges a temporary storage of information at the SV 104 by way of sending the designated-time transmission E-mail with respect to the facsimile image information which is required to be sent at the designated time. The NFAX 100 also arranges a retrieval of the designated-time transmission E-mail so as to transmit the facsimile image information at the designated time. Thereby, the NFAX 100 can conserve the image memory 9 and avoid a problem of insufficient memory capacity which may be caused when a number of the image information transmission operations with the designated-time transmission mode are performed.

Next, a third exemplary memory saving operation of the NFAX 100 is explained with reference to FIGS. 10–12. The third exemplary memory saving operation relates to a virtual memory operation in which the NFAX 100 uses the memory capacity of the SV 104 as its own external memory. The NFAX 100 may perform such a virtual memory operation for storing various kinds of information including using it as a quick dial store for storing a quick dial number (e.g., a one-touch-dial number and an abbreviated dial number), a document bank for storing important image information, and so forth, which information are normally stored in the image memory 9 or the parameter memory 3 of the NFAX 100. The NFAX 100 performs this virtual memory operation by way of generating a virtual memory E-mail.

FIG. 10 illustrates an example of virtual memory E-mail 50 arranged in a MIME format. The virtual memory E-mail 50 of FIG. 10 transfers quick dial number information. As shown in FIG. 10, the virtual memory E-mail 50 includes a header 51 and a first part 52. The header 51 identifies the nature of the E-mail, with various kinds of information such as "Date: 30 Sep 1997 14:07:50 +0900," "To: NFAX100/002@ricoh.co.jp," "From: NFAX100/002@ricoh.co.jp", "Subject: QUICK DIAL," and so forth. The indication "Date: 30 Sep 1997 14:07:50 +0900" of the header 51 identifies the date of transmission of the virtual memory E-mail. The indication "To: NFAX100/002@ricoh.co.jp" identifies an E-mail address of a destination communications terminal, which is identical to a second E-mail address of the NFAX 100. The indication "From: NFAX100/002@ricoh.co.jp" identifies an E-mail address of a source communications terminal, which is identical also to the second E-mail address of the NFAX 100. With these indications, the virtual memory E-mail can be returned to the NFAX 100 when so requested. In addition, with these indications which are different from those for the print queue E-mail of FIG. 4 and the designated-time transmission E-mail of FIG. 7, the NFAX 100 can handle the virtual memory E-mail operation in parallel to the print queue E-mail and designated-time transmission E-mail operations. Preferably, these E-mail addresses may be changed upon a choice of the operator. The indication "Subject: QUICK DIAL" indicates that the subject contents of the virtual memory E-mail is quick dial information.

The first part 52 identifies the nature of the document contained in the E-mail, with various kinds of information such as "Type: Quick Dial," "Dial No: 01," "Line: G3," "Address: 03-456-1234," "Name: ABC Company," and so forth. The indication "Type: Quick Dial" of the first part 52 indicates that the E-mail is virtual memory E-mail containing quick dial information. The indication "Dial No: 01" indicates that the registered quick dial is 01 for a destination communications terminal. The indication "Line: G3" indicates that the destination communications terminal is the facsimile terminal using the Group 3 facsimile communications procedure. The indication "Address: 03-456-1234" indicates that the facsimile number of the destination facsimile terminal is 03-456-1234. The indication "Name: ABC Company" identifies the name of the user of the destination facsimile number. The second part 53 contains the MIME-formatted document representing all the pages of the image information.

FIG. 11 illustrates an example of virtual memory E-mail 60 arranged in a MIME format. The virtual memory E-mail 60 of FIG. 11 transfers the information bank. As shown in FIG. 11, the virtual memory E-mail 60 includes a header 61, a first part 62, and a second part 63. The contents of information included in the header 61 are similar to those of header 51 of FIG. 10, except for the contents of the "To:," "From:," and "Subject:" fields. The indication "To: NFAX100/003@ricoh.co.jp" identifies an E-mail address of a destination communications terminal, which is identical to a third E-mail address of the NFAX 100. The indication "From:NFAX100/003@ricoh.co.jp" identifies an E-mail address of a source communications terminal, which is identical to the NFAX 100. With these indications, the virtual memory E-mail can be returned to the NFAX 100 when so requested. In addition, with these indications which are different from those for the print queue E-mail of FIG. 4, the designated-time transmission E-mail of FIG. 7, and the virtual memory E-mail of FIG. 10, the NFAX 100 can handle the operation of the virtual memory E-mail of FIG. 11 in parallel to these other E-mail operations. Preferably, these E-mail addresses may be changed upon a choice of the operator. The indication "Subject: DOCUMENT BANK" indicates that the subject contents of the virtual memory E-mail is the document bank.

The first part 62 identifies the nature of document contained in the E-mail, with various kinds of information such as "Type: Document Bank," "Dial No: 01," and "Name: Map Around ABC Company." The indication "Type: Document Bank" indicates that the E-mail is virtual memory E-mail containing a specific document bank. The indication "Dial No: 01" indicates that the registered quick dial for retrieving the specific document bank is 01. The indication "Name: Map Around ABC Company" identifies the name of the contents of the virtual memory E-mail. The second part 63 contains the MIME-formatted document representing all the pages of the image information with respect to the map around the ABC Company.

Figure 12:
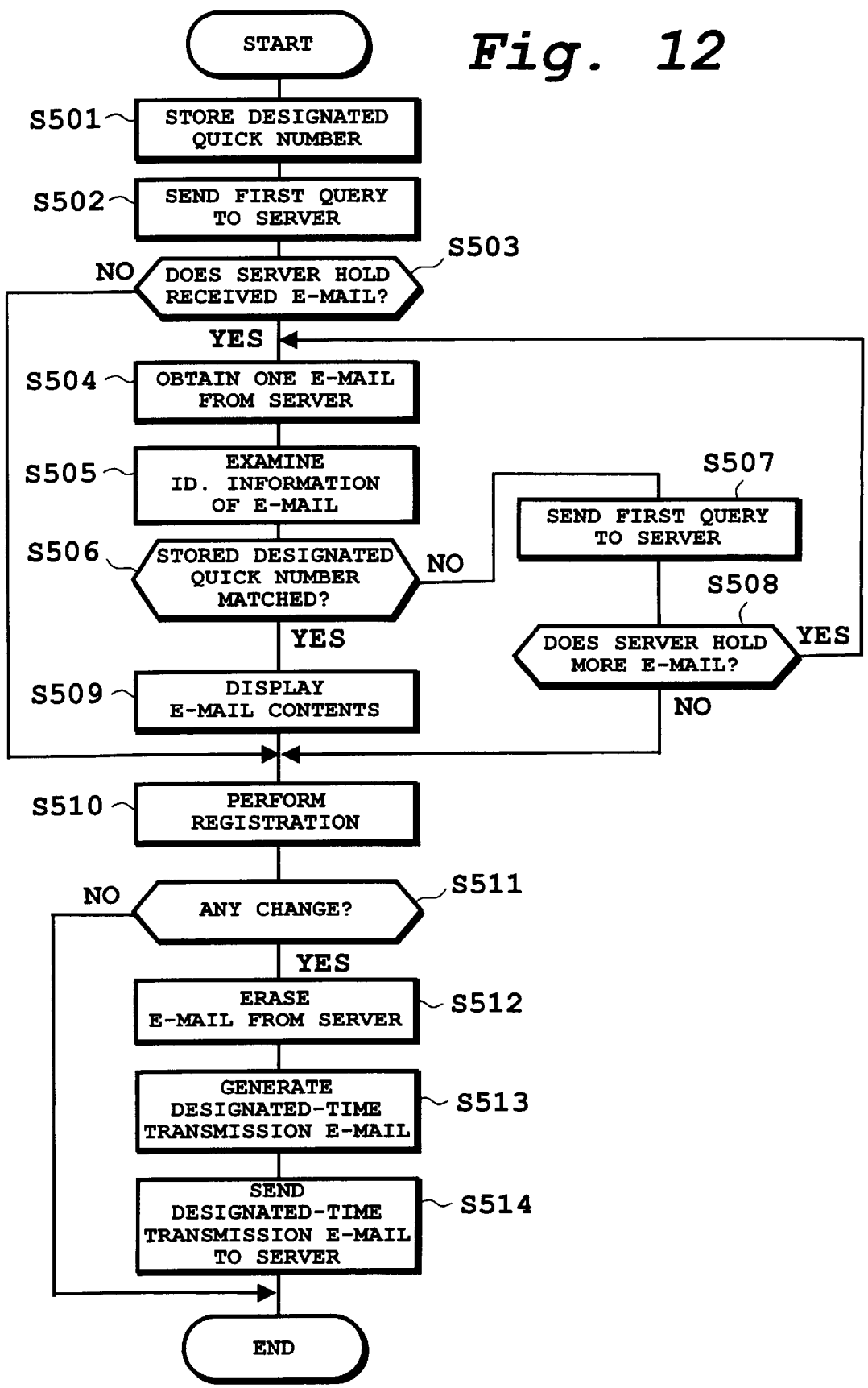
FIG. 12 is a flowchart for explaining an exemplary information registration operation by way of virtual memory electronic mail operation of the network facsimile apparatus of FIG. 3.

FIG. 12 explains an exemplary operation of the NFAX 100 for registering information by way of generating the virtual memory E-mail, with respect to the quick dial (e.g., the one-touch-dial or the abbreviated dial) or the document bank. In Step S501 of FIG. 12, the operator designates a specific dial number (e.g., 01) on the NFAX 100, and the system controller 1 of the NFAX 100 accordingly stores the specific dial number. In Step S502 of FIG. 12, the system controller 1 instructs the LAN data transmission controller 13 to send a first query to the SV 104 asking for a storage of at least a file of E-mail addressed to the NFAX 100. Upon receiving the first query, the SV 104 returns an answer to the first query to the NFAX 100. In Step S503, the system controller 1 determines, with the answer from the SV 104, whether the SV 104 stores at least a file of E-mail which has been addressed to the NFAX 100. When the SV 104 stores no file of E-mail which has been addressed to the NFAX 100 and the check result of Step S503 is NO, the process proceeds to Step S510 (explained later).

When the SV 104 stores at least a file of E-mail which has been addressed to the NFAX 100 and the check result of Step S503 is YES, the process proceeds to Step S504. In Step S504, the system controller 1 instructs the LAN data transmission controller 13 to obtain a file of E-mail addressed to the NFAX 100. Upon obtaining a file of E-mail using the LAN data transmission controller 13, the system controller 1 examines the document identification information contained in the E-mail, in Step S505.

In accordance with the examination result of Step S505, the system controller 1 determines, in Step S506, whether the obtained E-mail includes the value in the "Dial No:" field which is identical to the specific dial number which is stored on the NFAX 100 in Step S501. When the obtained E-mail does not include the "Dial No:" value identical to the stored specific dial number and the determination result of Step S506 is NO, the process proceeds to Step S507.

In Step S507, the system controller 1 instructs the LAN data transmission controller 13 to send a second query to the SV 104 asking if the SV 104 still holds a file of E-mail which is addressed to the NFAX 100. Upon receiving the second query, the SV 104 returns an answer to the second query to the NFAX 100. In Step S508, the system controller 1 determines, with the answer from the SV 104, whether the SV 104 still holds a file of E-mail which has been addressed to the NFAX 100. When the SV 104 still holds a file of E-mail which has been addressed to the NFAX 100 and the check result of Step S508 is YES, the operation returns to Step S504 to repeat the operation. When the SV 104 holds no file of E-mail which has been addressed to the NFAX 100 and the check result of Step S508 is NO, the process proceeds to Step S510 (explained below).

When the obtained E-mail includes the "Dial No:" value identical to the stored specific dial number and the determination result of Step S506 is YES, the process proceeds to Step S509. In Step S509, the system controller 1 arranges to display the contents of the obtained E-mail on a display of the display panel unit 7. Then, in Step S510, the operator performs the information registration operation in a predetermined procedure. The information registration operation includes a new generation or modification of contents. Upon a completion of the information registration operation by the operator, the system controller 1 examines, in Step S511, whether the operator has generated or modified the contents during the information registration operation performed in Step S510. When the operator has not generated or modified the contents and the examination result of Step S511 is NO, the operation ends. When the operator has generated or modified the contents and the examination result of Step S511 is YES, the process proceeds to Step S512 in which the system controller 1 instructs the LAN data transmission controller 13 to send to the SV 104 a request for erasing the corresponding E-mail which has been obtained from the SV 104 in Step S504.

Then, in Step S513, the system controller 1 generates new virtual memory E-mail based on the information prepared through the information registration operation by the operator in Step S510. Then, in Step S514, the system controller 1 sends the new virtual memory E-mail to the SV 104. Then, the process ends.

In this way, the NFAX 100 arranges a temporary storage of information, such as the quick dial number, the document bank, and so forth, at the SV 104 by way of generating the virtual memory E-mail. The NFAX 100 also arranges a retrieval of the virtual memory E-mail so as to use the information. Thereby, the NFAX 100 can save the parameter memory 3 and/or the image memory 9 and avoid a problem of insufficient memory capacity of these memories, which may be caused when a number of information, such as the quick dial number, the document bank, and so forth, are accumulated in the parameter memory 3 and/or the image memory 9.

The embodiments of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This application is based on Japanese Patent Application No. JPAP10-046327 filed Feb. 13, 1998, the entire contents of which are herein incorporated by reference.

What is claimed is:

1. A data terminal apparatus coupled to a local area network and to a telephone network, comprising:

a first communications mechanism exchanging electronic mail with other data terminals and a mail server on said local area network;

a second communications mechanism exchanging image information with facsimile terminals on said telephone network;

a memory that stores said image information received from one of said facsimile terminals through said telephone network using said second communications mechanism;

a printer that reproduces said image information;

a first controller that generates electronic mail which includes said image information when said printer is in an inoperative condition, sends said electronic mail to said mail server through said local area network using said first communications mechanism, and erases said image information from said memory, wherein at least a source address and a destination address of said electronic mail correspond to an electronic mail address of said data terminal apparatus; and a second controller that retrieves said electronic mail from said mail server when said printer recovers from said inoperative condition and instructs said printer to reproduce said image information included in said electronic mail.

2. A data terminal apparatus coupled to a local area network and to a telephone network, comprising:

a first communications mechanism exchanging electronic mail with other data terminals and a mail server on said local area network;

a second communications mechanism exchanging image information with facsimile terminals on said telephone network;

a memory that stores arbitrary image information required to be sent at a designated time to at least one of said facsimile terminals through said telephone network using said second communications mechanism;

a first controller that generates electronic mail which includes said arbitrary image information stored in said memory, sends said electronic mail to said mail server through said local area network using said first communications mechanism, and erases said arbitrary image information from said memory, wherein at least a source address and a destination address of said electronic mail correspond to an electronic mail address of said data terminal apparatus; and a second controller that retrieves said electronic mail from said mail server when said designated time has passed, obtains said arbitrary image information included in said electronic mail, and sends said arbitrary image information to said at least one of said facsimile terminals.

3. A data terminal apparatus coupled to a local area network and to a telephone network, comprising:

a first communications mechanism exchanging electronic mail with other data terminals and a mail server on said local area network;

a second communications mechanism exchanging image information with facsimile terminals on said telephone network;

a memory that stores arbitrary information;

a first controller that generates electronic mail which includes said arbitrary information stored in said memory, sends said electronic mail to said mail server through said local area network using said first communications mechanism, and erases said arbitrary information from said memory, wherein at least a source address and a destination address of said electronic mail correspond to an electronic mail address of said data terminal apparatus; and a second controller that retrieves said electronic mail from said mail server upon a request by an operator or by an operation being performed on said data terminal apparatus, obtains said arbitrary information included in said electronic mail, and provides said arbitrary information to said operator or said operation.

4. The data terminal apparatus of claim 3, wherein said arbitrary information is a one-touch dial number.

5. The data terminal apparatus of claim 3, wherein said arbitrary information is an abbreviated dial number.

6. The data terminal apparatus of claim 3, wherein said arbitrary information is image information.

7. The data terminal apparatus of claim 4, wherein said first controller is capable of changing an electronic mail address when generating said electronic mail.

8. A data terminal apparatus coupled to a local area network and to a telephone network, comprising:

first communications means for exchanging electronic mail with other data terminals and a mail server on said local area network;

second communications means for exchanging image information with facsimile terminals on said telephone network;

memory means for storing said image information received from one of said facsimile terminals through said telephone network using said second communications means;

printer means for printing said image information;

first controlling means for generating electronic mail which includes said image information when said printer means is in an inoperative condition, sending said electronic mail to said mail server through said local area network using said first communications means, and erasing said image information from said memory means, wherein at least a source address and a destination address of said electronic mail correspond to an electronic mail address of said data terminal apparatus; and second controlling means for retrieving said electronic mail from said mail server when said printer means recovers from said inoperative condition and instructing said printer means to reproduce said image information included in said electronic mail.

9. A data terminal apparatus coupled to a local area network and to a telephone network, comprising:

first communications means for exchanging electronic mail with other data terminals and a mail server on said local area network;

second communications means for exchanging image information with facsimile terminals on said telephone network;

memory means for storing arbitrary image information required to be sent at a designated time to at least one of said facsimile terminals through said telephone network using said second communications means;

first controlling means for generating electronic mail which includes said arbitrary image information stored in said memory means, sending said electronic mail to said mail server through said local area network using said first communications means, and erasing said arbitrary image information from said memory means, wherein at least a source address and a destination address of said electronic mail correspond to an electronic mail address of said data terminal apparatus; and second controlling means for retrieving said electronic mail from said mail server when said designated time has passed, obtaining said arbitrary image information included in said electronic mail, and sending said arbitrary image information to said at least one of said facsimile terminals.

10. A data terminal apparatus coupled to a local area network and to a telephone network, comprising:

first communications means for exchanging electronic mail with other data terminals and a mail server on said local area network;

second communications means for exchanging image information with facsimile terminals on said telephone network;

memory means for storing arbitrary information;

first controlling means for generating electronic mail which includes said arbitrary information stored in said memory means, sending said electronic mail to said mail server through said local area network using said first communications means, and erasing said arbitrary information from said memory means, wherein at least a source address and a destination address of said electronic mail correspond to an electronic mail address of said data terminal apparatus; and second controlling means for retrieving said electronic mail from said mail server upon a request by an operator or by an operation being performed on said data terminal apparatus, obtaining said arbitrary information included in said electronic mail, and providing said arbitrary information to said operator or said operation.

11. The data terminal apparatus of claim 10, wherein said arbitrary information is a one-touch dial number.

12. The data terminal apparatus of claim 10, wherein said arbitrary information is an abbreviated dial number.

13. The data terminal apparatus of claim 10, wherein said arbitrary information is image information.

14. The data terminal apparatus of claim 10, wherein said first controlling means is capable of changing an electronic mail address when generating said electronic mail.

15. A memory saving method for a data terminal apparatus coupled to a local area network and to a telephone network, comprising:
- receiving image information from a facsimile terminal through said telephone network:
- storing said image information received from said facsimile terminal;
- checking whether a printer of said data terminal apparatus is in an operative condition;
- generating electronic mail which includes said image information when said printer is in an inoperative condition, wherein at least a source address and a destination address of said electronic mail correspond to an electronic mail address of said data terminal apparatus;
- sending said electronic mail to a mail server on said local area network;
- erasing said image information from said memory;
- checking whether said printer of said data terminal apparatus recovers from said inoperative condition;
- retrieving said electronic mail from said mail server when said printer recovers from said inoperative condition; and
- instructing said printer to reproduce said image information included in said electronic mail.

16. A method of a data terminal apparatus coupled to a local area network and to a telephone network, comprising:
- inputting a designated-time transmission instruction for transmitting arbitrary image information;
- storing said arbitrary image information;
- generating electronic mail which includes said arbitrary image information stored in said memory, wherein at least a source address and a destination address of said electronic mail correspond to an electronic mail address of said data terminal apparatus;
- sending said electronic mail to a mail server on said local area network;
- erasing said arbitrary image information from said memory means;
- checking whether said designated time has passed;
- retrieving said electronic mail from said mail server when said designated time has passed;
- obtaining said arbitrary image information included in said electronic mail; and
- sending said arbitrary image information to said at least one of said facsimile terminals.

17. A method of a data terminal apparatus coupled to a local area network and to a telephone network, comprising:
- inputting arbitrary information;
- storing said arbitrary information;
- generating electronic mail which includes said arbitrary information stored in said memory, wherein at least a source address and a destination address of said electronic mail correspond to an electronic mail address of said data terminal apparatus;
- sending said electronic mail to a mail server on said local area network;
- erasing said arbitrary information from said memory;
- retrieving said electronic mail from said mail server upon a request by an operator or by an operation being performed on said data terminal apparatus;
- obtaining said arbitrary information included in said electronic mail; and
- providing said arbitrary information to said operator or said operation.

18. The method of claim 17, wherein said arbitrary information is a one-touch dial number.

19. The method of claim 17, wherein said arbitrary information is an abbreviated dial number.

20. The method of claim 17, wherein said arbitrary information is image information.

21. The method of claim 17, wherein said first controlling means is capable of changing an electronic mail address when generating said electronic mail.

22. An electronic communications system, comprising:
- a data terminal apparatus coupled to a local area network and to a telephone network, said data terminal apparatus comprising:
  - a first communications mechanism exchanging electronic mail with other data terminals and a mail server on said local area network;
  - a second communications mechanism exchanging image information with facsimile terminals on said telephone network;
  - a memory that stores said image information received from one of said facsimile terminals through said telephone network using said second communications mechanism;
  - a printer that reproduces said image information;
  - a first controller that generates electronic mail which includes said image information when said printer is in an inoperative condition, sends said electronic mail to said mail server through said local area network using said first communications mechanism, and erases said image information from said memory, wherein at least a source address and a destination address of said electronic mail correspond to an electronic mail address of said data terminal apparatus; and
  - a second controller that retrieves said electronic mail from said mail server when said printer recovers from said inoperative condition and instructs said printer to reproduce said image information included in said electronic mail.

23. An electronic communications system, comprising:
- a data terminal apparatus coupled to a local area network and to a telephone network, said data terminal apparatus comprising:
  - a first communications mechanism exchanging electronic mail with other data terminals and a mail server on said local area network;
  - a second communications mechanism exchanging image information with facsimile terminals on said telephone network;
  - a memory that stores arbitrary image information required to be sent at a designated time to at least one of said facsimile terminals through said telephone network using said second communications mechanism;
  - a first controller that generates electronic mail which includes said arbitrary image information stored in said memory, sends said electronic mail to said mail server through said local area network using said first communications mechanism, and erases said arbitrary image information from said memory, wherein at least a source address and a destination address of said electronic mail correspond to an electronic mail address of said data terminal apparatus; and
  - a second controller that retrieves said electronic mail from said mail server when said designated time has passed, obtains said arbitrary image information included in said electronic mail, and sends said arbitrary image information to said at least one of said facsimile terminals.

24. An electronic communications system, comprising:

a data terminal apparatus coupled to a local area network and to a telephone network, said data terminal apparatus comprising:

a first communications mechanism exchanging electronic mail with other data terminals and a mail server on said local area network;

a second communications mechanism exchanging image information with facsimile terminals on said telephone network;

a memory that stores arbitrary information;

a first controller that generates electronic mail which includes said arbitrary information stored in said memory, sends said electronic mail to said mail server through said local area network using said first communications mechanism, and erases said arbitrary information from said memory, wherein at least a source address and a destination address of said electronic mail correspond to an electronic mail address of said data terminal apparatus; and a second controller that retrieves said electronic mail from said mail server upon a request by an operator or by an operation being performed on said data terminal apparatus, obtains said arbitrary information included in said electronic mail, and provides said arbitrary information to said operator or said operation.

25. The system of claim 24, wherein said arbitrary information is a one-touch dial number.

26. The system of claim 24, wherein said arbitrary information is an abbreviated dial number.

27. The system of claim 24, wherein said arbitrary information is image information.

28. The system of claim 24, wherein said first controller is capable of changing an electronic mail address when generating said electronic mail.

* * * * *